US009066354B2

(12) United States Patent
Jin et al.

(10) Patent No.: US 9,066,354 B2
(45) Date of Patent: Jun. 23, 2015

(54) SYNCHRONIZING BEARER CONTEXT

(76) Inventors: Haipeng Jin, Carlsbad, CA (US); Osok Song, San Diego, CA (US)

( * ) Notice: Subject to any disclaimer, the term of this patent is extended or adjusted under 35 U.S.C. 154(b) by 810 days.

(21) Appl. No.: 12/563,425

(22) Filed: Sep. 21, 2009

(65) Prior Publication Data

US 2010/0081444 A1    Apr. 1, 2010

Related U.S. Application Data

(60) Provisional application No. 61/100,598, filed on Sep. 26, 2008.

(51) Int. Cl.
| | | |
|---|---|---|
| *H04W 72/00* | (2009.01) | |
| *H04J 3/06* | (2006.01) | |
| *H04W 36/08* | (2009.01) | |
| *H04W 36/22* | (2009.01) | |
| *H04W 76/06* | (2009.01) | |
| *H04W 56/00* | (2009.01) | |
| *H04W 72/04* | (2009.01) | |
| *H04W 36/00* | (2009.01) | |

(52) U.S. Cl.
CPC .......... *H04W 76/062* (2013.01); *H04W 76/064* (2013.01); *H04W 56/001* (2013.01); *H04W 76/066* (2013.01); *H04W 72/04* (2013.01); *H04W 36/0033* (2013.01)

(58) Field of Classification Search
USPC ................. 370/350, 329, 328, 312, 432, 503; 455/450, 550.1
See application file for complete search history.

(56) References Cited

U.S. PATENT DOCUMENTS 5,926,469 A *  7/1999 Norstedt et al. ............... 370/329
6,847,610 B1 *  1/2005 Suumaki et al. ........... 370/230.1
(Continued)

FOREIGN PATENT DOCUMENTS

| EP | 1802049 A1 | 6/2007 |
| EP | 1284073 B1 | 8/2007 |

(Continued)

OTHER PUBLICATIONS

"3rd Generation Partnership Project; Technical Specification Group Core Network and Terminals; 3GPP System Architecture Evolution; CT WG1 Aspects (Release 8)" 3GPP TR 24.801 v0.4.0, 3GPP Draft; 24801-040, 3rd Generation Partnership Project (3GPP), Mobile Competence Centre ; 650, Route Des Lucioles ; F-06921 Sophia-Antipolis Cedex ; France, vol. CT WG1, No. Sophia Antipolis, France; 20071029, Oct. 29, 2007, XP050026830 [retrieved on Oct. 29, 2007].

(Continued)

*Primary Examiner* — Candal Elpenord
(74) *Attorney, Agent, or Firm* — François A. Pelaez

(57) ABSTRACT

Bearer context maintained by an access terminal is synchronized with a network so that a change in the status of the bearer context may be reflected at the network. For example, if an access terminal determines that a resource previously requested by the access terminal is no longer needed, the access terminal may deactivate the bearer context locally in a case where the access terminal is unable to communicate with the network. In such a case, the access terminal may synchronize its bearer context with the network once the access terminal reestablishes communication with the network. For example, the access terminal may send a message to the network indicating that the access terminal has deactivated the bearer context.

43 Claims, 8 Drawing Sheets

(56) References Cited

U.S. PATENT DOCUMENTS

| | | | |
|---|---|---|---|
| 7,039,026 B2 | 5/2006 | Francoeur et al. | |
| 7,366,156 B2* | 4/2008 | Ahn | 370/350 |
| 7,853,257 B2* | 12/2010 | Lv et al. | 455/435.1 |
| 7,916,691 B2* | 3/2011 | Kopplin | 370/329 |
| 7,933,006 B2 | 4/2011 | Kumamoto | 356/138 |
| 7,933,602 B1* | 4/2011 | Balakrishnan et al. | 455/437 |
| 7,953,006 B2* | 5/2011 | Pandey | 370/230.1 |
| 8,068,843 B2* | 11/2011 | Yi et al. | 455/450 |
| 8,842,593 B2 | 9/2014 | Zhang | 370/312 |
| 2004/0165577 A1* | 8/2004 | Ahn | 370/350 |
| 2005/0169249 A1* | 8/2005 | Shirota et al. | 370/352 |
| 2006/0023663 A1* | 2/2006 | Kim et al. | 370/329 |
| 2006/0120287 A1* | 6/2006 | Foti et al. | 370/231 |
| 2006/0233132 A1* | 10/2006 | Lee | 370/328 |
| 2008/0089303 A1* | 4/2008 | Wirtanen et al. | 370/342 |
| 2008/0130594 A1* | 6/2008 | Suzuki | 370/338 |
| 2008/0232292 A1* | 9/2008 | Zhang | 370/312 |
| 2009/0111428 A1* | 4/2009 | Blommaert et al. | 455/411 |
| 2009/0279489 A1* | 11/2009 | Deu-Ngoc et al. | 370/329 |
| 2010/0128649 A1* | 5/2010 | Gonsa et al. | 370/312 |

FOREIGN PATENT DOCUMENTS

| | | |
|---|---|---|
| JP | 8205228 A | 8/1996 |
| JP | 2006081173 A | 3/2006 |
| RU | 2273091 C2 | 3/2006 |
| WO | 02073810 A1 | 9/2002 |
| WO | WO2004112328 A1 | 12/2004 |
| WO | WO 2004112338 A1 * | 12/2004 |
| WO | 2008109568 A1 | 9/2008 |

OTHER PUBLICATIONS

International Search Report and Written Opinion—PCT/US2009/058654—ISA/EPO—Feb. 16, 2010.
Taiwan Search Report—TW098132590—TIPO—Oct. 19, 2012.

* cited by examiner

SYNCHRONIZING BEARER CONTEXT

CLAIM OF PRIORITY

This application claims the benefit of and priority to commonly owned U.S. Provisional Patent Application No. 61/100,598, filed Sep. 26, 2008, the disclosure of which is hereby incorporated by reference herein.

BACKGROUND

1. Field

This application relates generally to communication and more specifically, but not exclusively, to synchronizing bearer context.

2. Introduction

Wireless communication networks are widely deployed to provide various types of communication (e.g., voice, data, multimedia services, etc.) to multiple users. In a typical network, an access terminal (e.g., a cell phone) connects to the network via an access point whereby traffic flows between the access terminal and a desired endpoint (e.g., a server or a phone) through various network nodes. To facilitate this traffic flow, the network establishes one or more bearers that provide the quality of service (QoS) to be used for the traffic flow. Accordingly, once a bearer is established, the access terminal and the network each maintain bearer context for the bearer. This bearer context includes information that may be used, for example, in conjunction with identifying and processing packets of a given traffic flow. Specifically, the bear context includes a bearer identifier, packet filter information, and QoS information.

In some cases the network sets up a bearer in response to an access terminal-initiated resource request. For example, when a user initiates a call with an access terminal, the access terminal may send a message to the network requesting the network to set up resources for the call. In response, the network may establish a bearer for the traffic flow for this call. Once the access terminal no longer needs the resource (e.g., the user ends the call), the access terminal sends a resource release request to the network. The network may then deactivate the bearer whereupon the bearer context status (e.g., deactivated status) is synchronized between the network and the access terminal.

In some cases, however, the network may not receive the resource release request from the access terminal. For example, the access terminal may have temporarily moved out of the coverage area of the network. As a result, the bearer context maintained by the access terminal and the network may not be properly synchronized under these conditions. For example, the network will not know that these resources should be released.

SUMMARY

A summary of sample aspects of the disclosure follows. In the discussion herein, any reference to the term aspects may refer to one or more aspects of the disclosure.

The disclosure relates in some aspects to local deactivation of bearer context. For example, if an access terminal determines that a resource previously requested by the access terminal is no longer needed, the access terminal may deactivate the bearer context locally. Such local deactivation may be employed, for example, in the event the access terminal is unable to communicate with the network.

The disclosure relates in some aspects to synchronizing bearer context between an access terminal and a network. Here, in the event the access terminal locally deactivates bearer context after losing communication with the network, the access terminal may synchronize its bearer context with the network once the access terminal reestablishes communication with the network. For example, the access terminal may send a message to the network indicating that the access terminal has deactivated a bearer context. Based on this message, the network may update the status of the corresponding bearer context maintained at the network. In some implementations (e.g., in a long term evolution (LTE) network), the message may comprise a tracking area update message.

BRIEF DESCRIPTION OF THE DRAWINGS

These and other sample aspects of the disclosure will be described in the detailed description and the appended claims that follow, and in the accompanying drawings, wherein:

Figure 1:
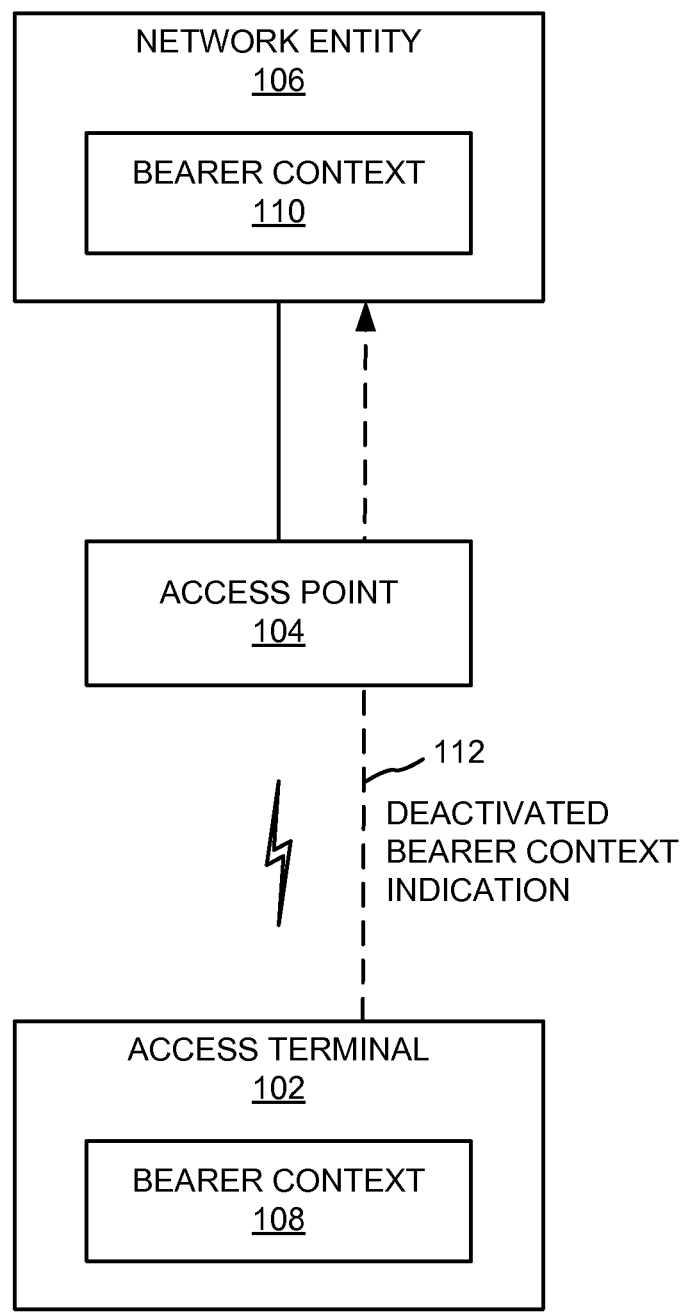
FIG. 1 is a simplified block diagram of several sample aspects of a communication system configured to support bearer context synchronization.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access points in the system 100 provide one or more services (e.g., network connectivity) for one or more wireless terminals that may be installed within or that may roam throughout a coverage area of the system 100. For example, at various points in time the access terminal 102 may connect to an access point 104 or some other access point (not shown). Each access point in the system 100 may communicate with one or more network entities (represented, for convenience, by network entity 106) to facilitate wide area network connectivity. These network entities may take various forms such as, for example, one or more radio and/or core network entities. Thus, in various implementations the network entity 106 may represent functionality such as at least one of: network management (e.g., via an operation, administration, management, and provisioning entity), call control, session management, mobility management, gateway functions, interworking functions, or some other suitable network functionality.

The access terminal 102 and the network entity 106 (e.g., a mobility management entity, MME) maintain information (bearer context 108 and 110, respectively) for a bearer that the network entity 106 established for traffic flow to and/or from the access terminal 102. In some cases, the network entity 106 may establish this bearer in response to a request for resources from the access terminal. At some later point in time, the access terminal 102 may send a request to release these resources and, as a result, trigger the release of the related bearer contexts. In the event the access terminal 102 is not able to communicate with the network entity 106 (e.g., due to the access terminal 102 being out of network coverage when the request is sent), the access terminal 102 may locally deactivate the bearer context 108. Subsequently, when the access terminal 102 is again able to communicate with the network entity 106 (e.g., the access terminal 102 returns to network coverage), the access terminal 102 synchronizes the bearer context 108 with the network entity 106. For example, the access terminal 102 may send a message (represented by dashed line 112) to the network entity 106 that indicates that the bearer context 108 has been deactivated.

Bearer context synchronization may be implemented in a variety of ways in accordance with the teachings herein. For example, in an evolved packet system (EPS) of an LTE network, user equipment (e.g., access terminal 102) sends a BEARER RESOURCE MODIFICATION REQUEST non-access stratum (NAS) message to an MME (e.g., network entity 106) to modify some aspect of a given bearer (e.g., request release of a resource). A timer T3481 is then started and used to determine whether an appropriate response is received within a given period of time. On the first expiry of the timer T3481, the user equipment (UE) shall resend the BEARER RESOURCE MODIFICATION REQUEST and shall reset and restart timer T3481. This retransmission is repeated four times, i.e., on the fifth expiry of timer T3481, the UE shall abort the procedure, release the procedure transaction identifier (PTI) allocated for this activation and enter the state PROCEDURE TRANSACTION INACTIVE. In addition, if the UE had initiated resource release for all the traffic flows for the bearer, it deactivates the EPS bearer context locally without peer-to-peer signaling between the UE and the MME. In order to synchronize the EPS bearer context status with the MME, on indication of "back to E-UTRAN coverage" from the lower layers, the UE shall send a TRACKING AREA UPDATE REQUEST message to the MME. Such a message may include, for example, an indication (an explicit or implicit indication) of the bearer context that was deactivated at the UE.

Sample operations that may be employed by the system 100 will now be described in more detail in conjunction with the flowchart of FIGS. 2A and 2B. For convenience, the operations of FIGS. 2A and 2B (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

Figure 2A:
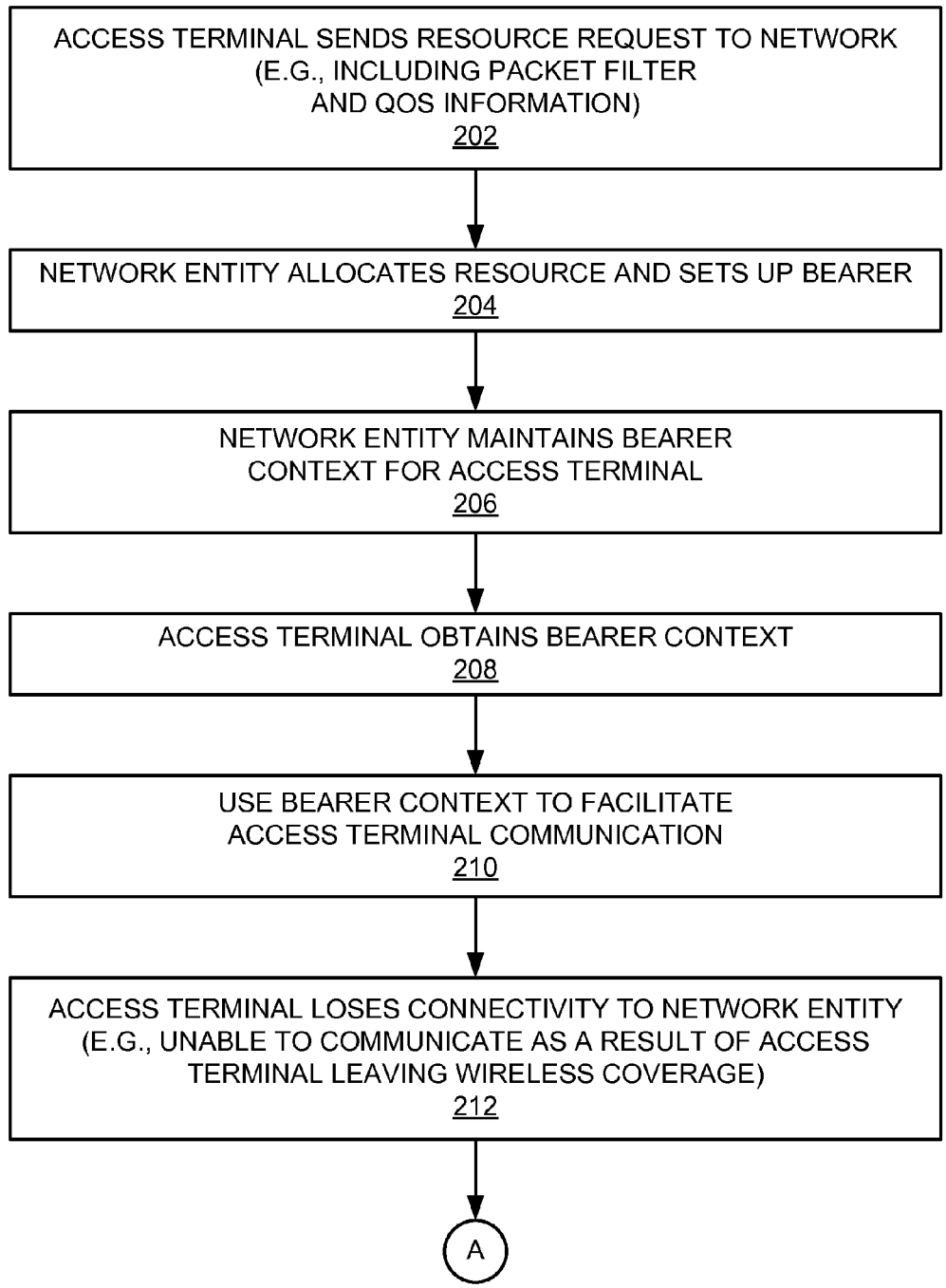
FIGS. 2A and 2B are a flowchart of several sample aspects of operations that may be performed to synchronize bearer context.

As represented by block 202 of FIG. 2A, at some point in time an access terminal sends a resource request to the network (e.g., a network entity such as a packet data network gateway, PGW). Such an access terminal-initiated resource request may be triggered, for example, by a user or an application of the access terminal initiating a traffic flow (e.g., a call, a download, etc.) at the access terminal.

Here, the resource request may comprise a request for Internet Protocol (IP) flow resources from the network. Accordingly, the request may include IP packet filter information and QoS information for the traffic flow.

In some aspects, the QoS information specifies how traffic is to be handled for the traffic flow. For example, the QoS information may specify at least one of: a desired or required level of information loss (e.g., maximum packet loss), a desired or required delay (e.g., maximum packet delay), a desired or required data rate, priority, or some other quality-related characteristic. In LTE-based networks, the QoS information may comprise a quality class identification (QCI) that indicates, for example, the type of delay or packet loss that are expected for an IP packet flow and the type of priority given for that IP packet flow.

In some aspects, the IP packet filter information is used to identify a given IP traffic flow (e.g., packet stream) that is associated with a particular bearer. To this end, an IP packet filter contains information that may be compared with IP header information of a packet that is used to identify the packet. For example, the IP packet filter information may comprise at least one of: a source address, a destination address, a source port, a destination port, or a protocol (e.g., the higher layer protocol that is being used, such as UDP or TCP). In some cases a packet filter may include a wild card address that is defined to match any address and/or a wildcard port that is defined to match any port. In a typical case, a packet filter comprises a 5-tuple including source address, destination address, source port, destination port, and protocol.

As represented by block 204, as a result of the resource request, a network entity (e.g., an MME) will allocate the requested resources and set up an associated bearer (e.g., a dedicated bearer). In some aspects, a bearer defines a logical pipe that specifies how a flow of traffic to and/or from an access terminal is to be handled by the network (e.g., specifies the QoS to be applied to that traffic). Here, the network entity maps the packet filter associated with the resource request to a bearer by establishing a new bearer or by modifying an existing bearer. As an example of the latter case, in the event a bearer having the requested QoS is already set up (e.g., for another packet filter), the network entity may modify that bearer to include the packet filter provided by the request.

As represented by block 206, after the bearer is set up, the network entity maintains bearer context for that bearer. For example, the network entity may store the bearer context in data memory and update the bearer context, as needed. Here, the bearer context comprises a bearer identifier, QoS information, and at least one packet filter.

As represented by block 208, in conjunction with bearer set up, the access terminal obtains the bearer context for the bearer. For example, the access terminal may store the bearer identifier (e.g., sent by the network entity in conjunction with setting up the bearer), the QoS information, and the packet filter(s) for that bearer in a data memory. The access terminal then maintains the bearer context for that bearer (e.g., updating the bearer context, as needed). Here, the access terminal may employ various techniques to associate the resource request (e.g., a packet filter of the request) to the bearer assigned by the network entity.

As one example, the association may be based on a procedure transaction ID (PTI). Here, the access terminal may compare a PTI included in the resource request with a PTI provided in a bearer setup (e.g., bearer establishment or modification) message received from the network entity to determine whether to associate the corresponding bearer with the resource request.

As another example, the association may be based on packet filter identification information. Here, an identifier associated with the packet filter may be sent to the network via the resource request. The network entity may then include that packet filter identifier in the bearer setup message sent to the access terminal Consequently, the access terminal may compare the sent identifier with the received identifier to determine whether to associate the corresponding bearer with the resource request.

As yet another example, the association may be based on comparison of the packet filter to the traffic filter template of the bearer. Here, when the network entity sends a message to the access terminal in conjunction with setting up the bearer, the network entity may indicate which packet filter is associated with this bearer. The access terminal may then compare the packet filter that was sent with the resource request with the packet filter sent by the network entity to determine whether to associate the corresponding bearer with the resource request.

As represented by block 210, once the bearer is established, the bearer context is used to facilitate communication between the access terminal and some other node (e.g., a phone, a server, etc.) via the network. For example, when the network (e.g., a PGW) receives a packet from the other node, the network will compare the packet header information with the packet filter and assign the packet to the appropriate bearer based on this comparison. In this way, the network may apply the appropriate QoS when routing the packet to the access terminal As represented by block 212, at some point in time, the access terminal may lose connectivity to the network entity (e.g., not be able to communicate with the MME). For example, the access terminal may move out of the wireless coverage area of the network, may experience excessive interference, may experience a coverage outage, etc.

Figure 2B:
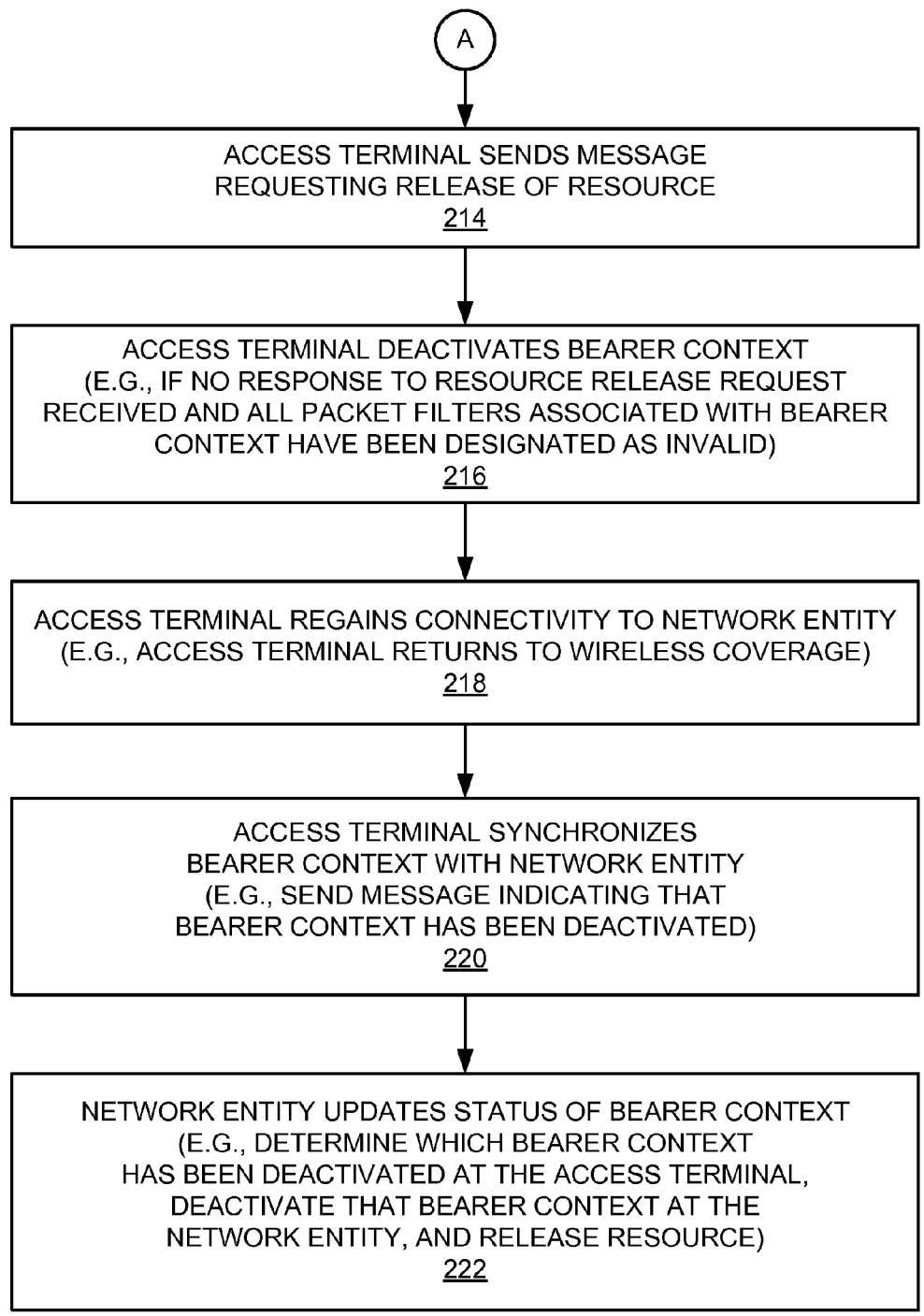

As represented by block 214 of FIG. 2B, the access terminal also may attempt to send a message to the network entity to request the release of a previously requested resource. For example, a user of the access terminal or an application executing on the access terminal may elect to terminate the traffic flow that was initiated at block 202 (e.g., the user may end a cell phone call or data feed). In this case, the access terminal may send a message indicating that the packet filter(s) and associated QoS should be released.

Here, the access terminal initiates the resource release so that the network entity may update its status accordingly (e.g., update state information for existing bearers). For example, under normal circumstances when the network entity does receive the release request, the network entity may deactivate (e.g., release or delete) the assigned bearer.

In a case where the access terminal has lost connectivity to the network, however, the network entity will not receive the resource release message from the access terminal. Consequently, the access terminal will not receive a message (e.g., a resource release message) from the network entity in response to the resource release request (e.g., the message is not received within a defined timeout period). As represented by block 216, in this case, the access terminal may invalidate (e.g., mark as invalid, delete, release, etc.) the packet filter associated with that bearer context and locally deactivate (e.g., release or delete) the bearer context associated with the resource release. As will be described in more detail in conjunction with FIG. 5, in general, the access terminal will locally deactivate a bearer context only after all packet filters associated with that bearer context have been invalidated at the access terminal. In any event, the access terminal maintains a record of which bearer context has been deactivated so that this may be reported as described below.

As represented by block 218, at some point in time the access terminal regains connectivity to the network entity. For example, the access terminal may return to wireless network coverage, the interference may decrease, the outage may pass, etc. In some cases, the reacquisition of connectivity may be indicated by a back to wireless coverage indication from a lower layer (e.g., layer 2) process.

As represented by block 220, the access terminal may then synchronize the bearer context with the network entity. For example, the access terminal may send a message to the network entity, wherein the message indicates (explicitly or implicitly) which bearer context has been locally deactivated by the access terminal. In this way, the network may determine which resources need to be released. As will be discussed in more detail in conjunction with FIG. 4, in some cases this message may comprise a tracking area update (TAU) message.

In some implementations the message may explicitly indicate which bearer context has been deactivated. For example, if the bearer context for bearer A has been deactivated, the message may indicate that this particular bearer context has been deactivated.

In some implementations the message may implicitly indicate which bearer context has been deactivated. For example, the network entity may know that bearers A, B, and C were used by the access terminal before the access terminal lost coverage. Upon returning to coverage the access terminal may send a message that indicates that bearers B and C are currently active. Hence, the network entity may determine that the access terminal deactivated the bearer context for bearer A.

As represented by block 222, in conjunction with synchronizing the bearer context, the network entity updates the status of the bearer context maintained at the network entity. For example, the network entity may deactivate the appropriate bearer context, deactivate (e.g., release or delete) the corresponding bearer, and release the corresponding resources.

Here, the network entity may determine which bearer context has been deactivated at the access terminal based on a message received from the access terminal. As discussed above, in some cases this involves reading an explicit indication from the message while in other cases this involved extrapolating which bearer context has been deactivated based on information received in the message and other information maintained by the network entity (e.g., a list that identifies each bearer context maintained for the access terminal).

The above scheme advantageously provides an efficient mechanism for synchronizing bearer context. In particular, when the network is not reachable, the access terminal may simply delete the appropriate bearer context. Accordingly, such a scheme may be implemented more efficiently than, for example, an alternate scheme where the access terminal keeps track of whether it has received a message in response to a resource release request and, if not, resend the resource release request to release the resource after the access terminal returns to coverage. In this alternate scheme, the NAS layer may need to maintain a very long timer for the NAS message expiration and undesirable NAS state layer management may be required (e.g., to remember the NAS message status).

Figure 3:
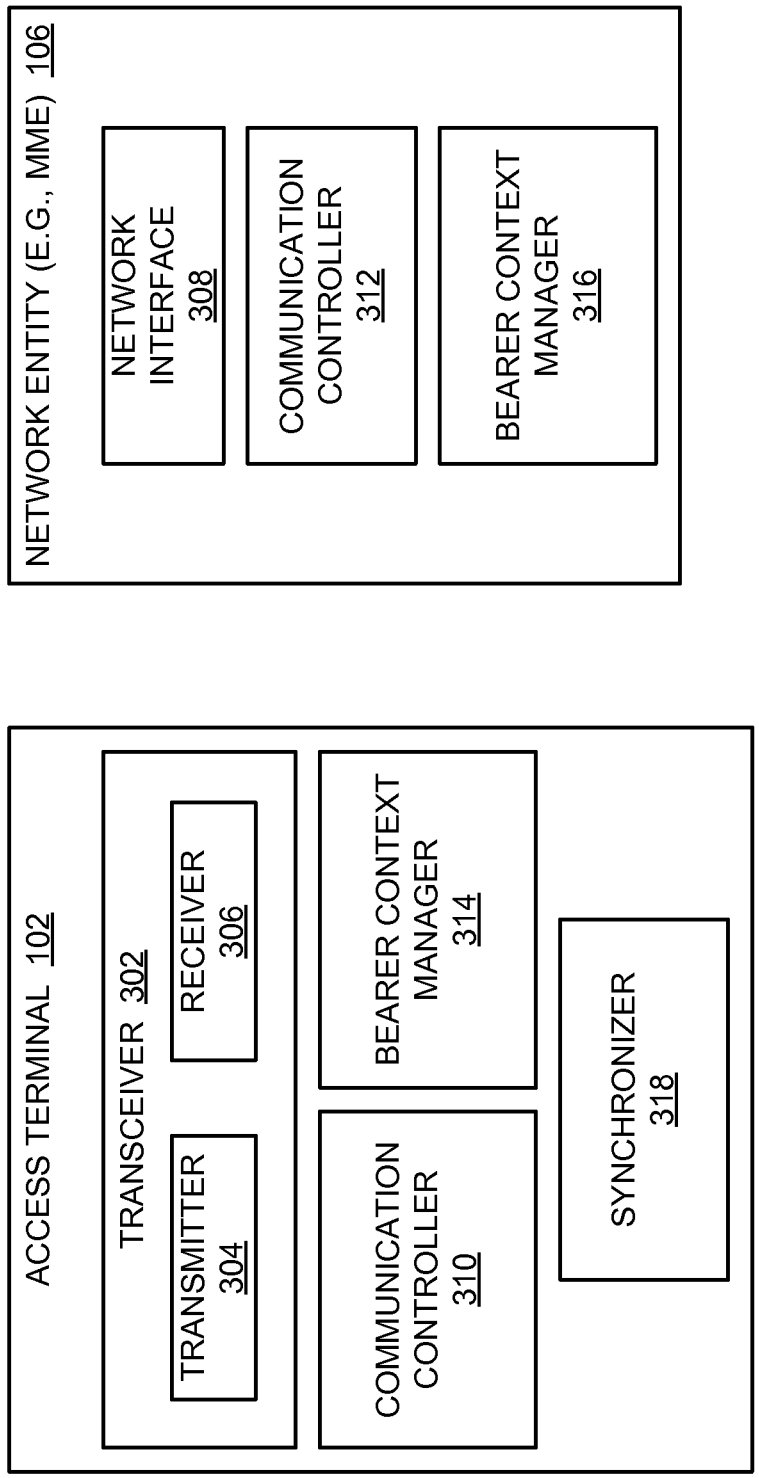
FIG. 3 is a simplified block diagram of several sample aspects of components that may be employed in communication nodes.

FIG. 3 illustrates several sample components that may be incorporated into nodes such as the access terminal 102 and the network entity 106 to perform bearer context synchronization operations as taught herein. The described components also may be incorporated into other nodes in a communication system. For example, other nodes in a system may include components similar to those described for the access terminal 102 and the network entity 106 to provide similar functionality. In addition, a given node may contain one or more of the described components. For example, an access terminal may contain multiple transceiver components that enable the access terminal to operate on multiple frequencies and/or communicate via different technologies.

As shown in FIG. 3, the access terminal 102 includes a transceiver 302 for communicating with other nodes. The transceiver 302 includes a transmitter 304 for sending signals (e.g., resource requests, resource release requests, and synchronization messages) and a receiver 306 for receiving signals (e.g., bearer setup messages).

The network entity 106 includes a network interface 308 for communicating with other network nodes (e.g., sending bearer setup messages and receiving resource requests, resource release requests, and synchronization messages). For example, the network interface 308 may be configured to communicate with one or more network nodes via a wired or wireless backhaul.

The access terminal 102 and the network entity 106 include other components that may be used in conjunction with bearer context synchronization operations as taught herein. For example, the access terminal 102 and the network entity 106 may include communication controllers 310 and 312, respectively, for managing communication with other nodes (e.g., sending and receiving messages, requests, and indications) and for providing other related functionality (e.g., as taught herein). In addition, the access terminal 102 and the network entity 106 may include bearer context managers 314 and 316, respectively, for managing bearer context (e.g., setting up, obtaining, maintaining, deactivating, and determining bearer context and updating status) and for providing other related functionality (e.g., as taught herein). Also, the access terminal 102 may include a synchronizer 318 for synchronizing bearer context (e.g., in cooperation with or as part of the bearer context manager 314) and for providing other related functionality (e.g., as taught herein).

Figure 4:
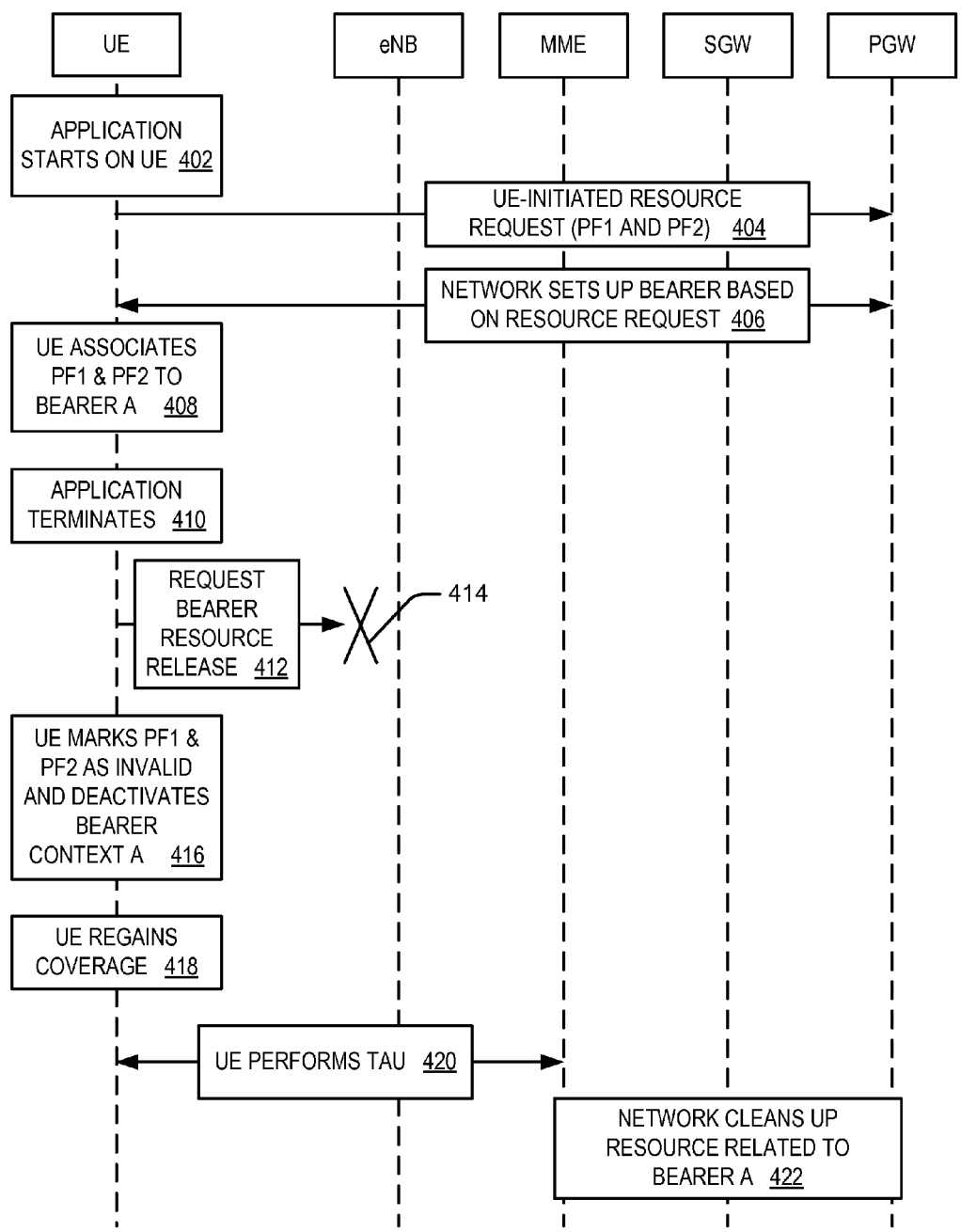
FIG. 4 is a simplified call flow diagram illustrating several sample operations that may be performed to synchronize bearer context.

Referring now to FIG. 4, for purposes of illustration sample bearer management operations will be described in the context of an LTE-based network. Accordingly, LTE terminology with be used in this example. It should be appreciated that these operations may be applicable to other types of networks.

As illustrated, signals to and from a UE are routed through a plurality of network entities including an enhanced node B (eNB), MME, serving gateway (SGW), and PGW. The illustrated operational flow begins at block 402 with, for example, the launch of an application on the UE. As represented by block 404, the UE requests resources from the network, which triggers the network to set up a bearer at block 406. In this example, the resource request identifies two packet filters designated PF1 and PF2. As described herein, when the UE requests resources from the network, the UE maintains association information between the packet filters and the allocated bearer at block 408. For this particular example, PF1 and PF2 are associated with a bearer context A.

As represented by block 410, the UE application is terminated at some point in time. Here, it should be noted that such termination could be voluntary (e.g., ending a call) or involuntary (e.g., losing coverage). Once the UE application is terminated, the UE sends a resource release request (e.g., BEARER RESOURCE MODIFICATION REQUEST) as represented by block 412. Here, however, if the network is not reachable when the UE sends this request, the request is not able to reach the network as represented by the "X" 414 (e.g., upon the fifth expiry of the timer T3481). In this case, the UE may abort the procedure, release the PTI allocated for this activation, and enter the state PROCEDURE TRANSACTION INACTIVE. As represented by block 416, the UE marks the packet filter associated to the resource release as invalid and, if all packet filters related to a bearer context become invalid in this process (e.g., the UE has initiated resource release for all the traffic flows for the bearer), the UE may deactivate the bearer context locally. Here, it should be appreciated that the UE deactivates the bearer context without peer-to-peer signaling between the UE and the MME. After the UE returns to coverage at block 418 (e.g., upon indication of "back to E-UTRAN coverage" from the lower layers), the UE synchronizes the bearer context status with the MME by sending a TAU request or equivalent message to the MME at block 420. As discussed herein, the information carried by such a message indicates which bearer has been deleted so that the network may release the resources properly at block 422.

Figure 5:
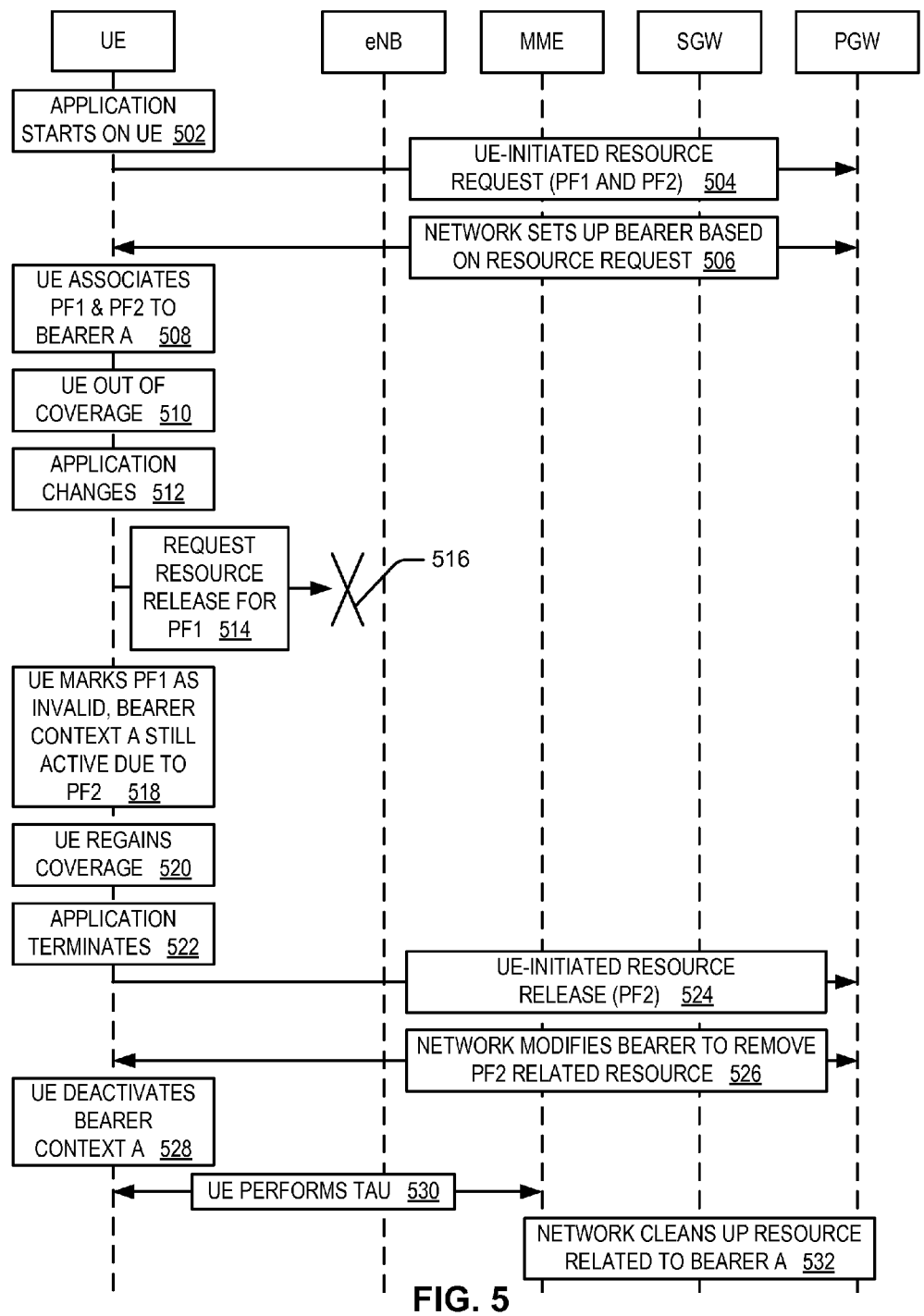
FIG. 5 is a simplified call flow diagram illustrating several sample operations that may be performed to synchronize bearer context.

As mentioned above, in some cases more than one packet filter may be associated with a given bearer (and the associated bearer context). In these cases, an access terminal may not locally deactivate a bearer context until all of the packet filters associated with that bearer context have been invalidated (e.g., marked as invalid, deleted, released, etc.). Thus, in a case where the UE is out of coverage and releases IP resources, but only part of a packet filter associated with a bearer is marked as invalid (e.g., PF1 is invalid, yet PF2 is still valid), bearer context A may not be deleted. FIG. 5 illustrates sample operations that may be employed under these circumstances. These operations also will be described in the context of an LTE-based network for illustration purposes.

As illustrated, messages to and from the UE are again routed through a plurality of network entities including an eNB, MME, SGW, and PGW. In addition, blocks 502, 504, 506, and 508 are analogous to blocks 402, 404, 406, and 408 of FIG. 4. As represented by block 510, at some point in time the UE loses coverage. When out of coverage, it is assumed that a user or some other stimulus initiated a change to the UE application as represented by block 512.

As represented by block 514, the UE sends a resource release request to release the resources that are no longer used by the application. In this example, the UE sends a resource release request for only PF1. As the network is not reachable, the resource release request fails to reach the network as represented by "X" 516. Upon detection of this failure, at block 518 the UE marks PF1 as invalid, but keeps bearer context A active because PF2 is still active. When the UE regains coverage at block 520, the bearer context A is thus still active.

As represented by block 522, the UE application is terminated at some point in time. After this application is terminated, the UE sends a request resource release for PF2 at block 524. At block 526, the network modifies bearer A to remove resources related to PF2.

As represented by block 528, the UE deactivates bearer context A. Here, in general, when the UE or the network removes the remaining packet filters for the bearer A, the UE may discover that all packet filters related to the bearer context are invalid and thus deactivate the bearer context. In this particular example, when PF2 is removed, the UE discovers that all packet filters are invalid for bearer context A and this causes the UE to deactivate the bearer context for bearer A.

At block 530, the UE then sends a TAU or an equivalent message to the network. As above, this message contains information to indicate which bearer context has been deactivated so that the network can properly release resources at block 532.

A bearer context synchronization scheme as taught herein may be implemented in various ways. For example, the techniques described herein may be employed when multiple bearers are used. In some cases, different bearers may be used to support different traffic flows for a given access terminal. In addition, the network may support different bearers for different access terminals. In these cases, the entities discussed herein (e.g., the access terminal and the MME) may synchronize bearer context for each of these bearers in accordance with the teachings herein.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
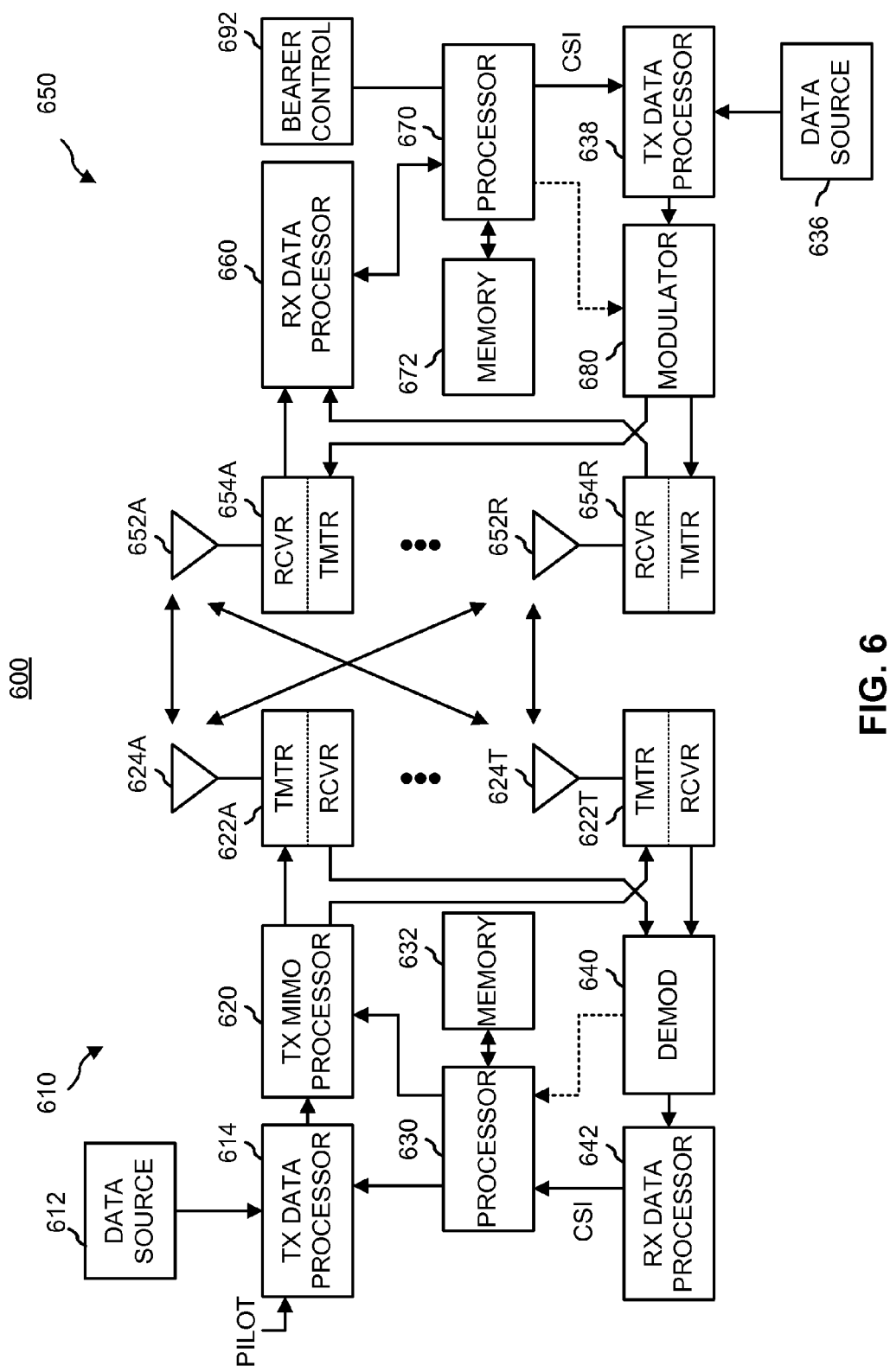
FIG. 6 is a simplified block diagram of several sample aspects of communication components.

FIG. 6 illustrates a wireless device 610 (e.g., an access point) and a wireless device 650 (e.g., an access terminal) of a sample MIMO system 600. At the device 610, traffic data for a number of data streams is provided from a data source 612 to a transmit (TX) data processor 614. Each data stream may then be transmitted over a respective transmit antenna.

The TX data processor 614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers (XCVR) 622A through 622T. In some aspects, the TX MIMO processor 620 applies beam-forming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622A through 622T are then transmitted from $N_T$ antennas 624A through 624T, respectively.

At the device 650, the transmitted modulated signals are received by $N_R$ antennas 652A through 652R and the received signal from each antenna 652 is provided to a respective transceiver (XCVR) 654A through 654R. Each transceiver 654 conditions (e.g., filters, amplifies, and downconverts) a respective received signal, digitizes the conditioned signal to provide samples, and further processes the samples to provide a corresponding "received" symbol stream.

A receive (RX) data processor 660 then receives and processes the $N_R$ received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654A through 654R, and transmitted back to the device 610.

At the device 610, the modulated signals from the device 650 are received by the antennas 624, conditioned by the transceivers 622, demodulated by a demodulator (DEMOD) 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform bearer context-related operations as taught herein. For example, a bearer control component 692 may cooperate with the processor 670 and/or other components of the device 650 to send/receive signals to/from another device (e.g., device 610) using bearer context or to manage bearer context. It should be appreciated that for each device 610 and 650 the functionality of two or more of the described components may be provided by a single component. For example, a single processing component may provide the functionality of the bearer control component 692 and the processor 670.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 7:
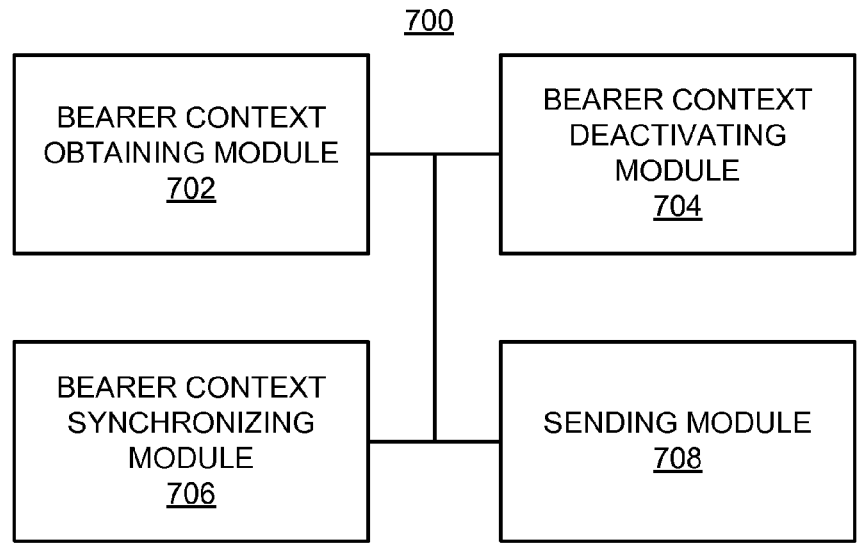
FIGS. 7 and 8 are simplified block diagrams of several sample aspects of apparatuses configured to provide bearer context synchronization as taught herein.
Figure 8:
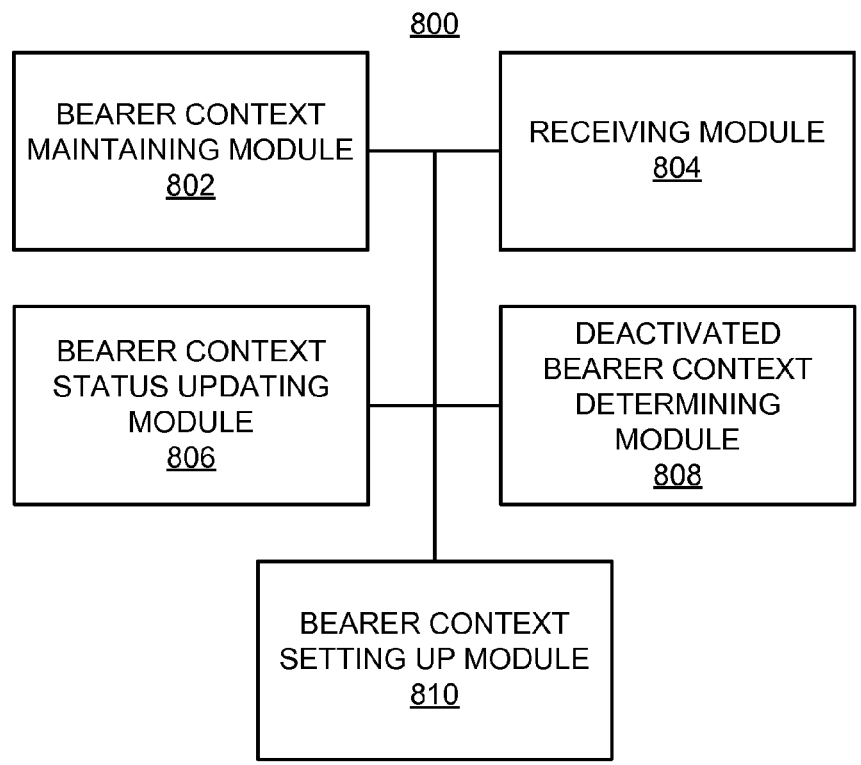

The functionality described herein (e.g., with regard to one or more of the accompanying figures) may correspond in some aspects to similarly designated "means for" functionality in the appended claims. Referring to FIGS. 7 and 8, apparatuses 700 and 800 are represented as a series of interrelated functional modules. Here, a bearer context obtaining module 702 may correspond at least in some aspects to, for example, a bearer context manager as discussed herein. A bearer context deactivating module 704 may correspond at least in some aspects to, for example, a bearer context manager as discussed herein. A bearer context synchronizing module 706 may correspond at least in some aspects to, for example, a synchronizer as discussed herein. A sending module 708 may correspond at least in some aspects to, for example, a communication controller as discussed herein. A bearer context maintaining module 802 may correspond at least in some aspects to, for example, a bearer context manager as discussed herein. A receiving module 804 may correspond at least in some aspects to, for example, a communication controller as discussed herein. A bearer context status updating module 806 may correspond at least in some aspects to, for example, a bearer context manager as discussed herein. A deactivated bearer context determining module 808 may correspond at least in some aspects to, for example, a bearer context manager as discussed herein. A bearer context setting up module 810 may correspond at least in some aspects to, for example, a bearer context manager as discussed herein.

The functionality of the modules of FIGS. 7 and 8 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 7 and 8 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   obtaining bearer context at an access terminal;
   locally deactivating the bearer context at the access terminal when the access terminal is unable to communicate with a network entity, wherein the deactivation is triggered by the access terminal initiating resource release for all traffic flows associated with the bearer context and is performed without peer-to-peer signaling between the access terminal and the network entity; and
   synchronizing the bearer context with the network entity after the deactivation, wherein the synchronization comprises sending a tracking area update request to the network entity.

2. The method of claim 1, wherein the tracking area update request is sent in response to a back to wireless coverage indication provided by a lower layer process.

3. The method of claim 1, further comprising sending a resource release request to the network entity, wherein the deactivation is triggered if the access terminal does not receive a resource release message from the network entity in response to the resource release request.

4. The method of claim 1, wherein the deactivation is triggered if each packet filter associated with the bearer context is designated as invalid.

5. The method of claim 1, wherein the synchronization comprises sending a message that indicates that the bearer context has been deactivated.

6. The method of claim 5, wherein the message is sent if the access terminal returns to wireless coverage.

7. The method of claim 5, wherein the message identifies any bearer context that is active at the access terminal.

8. The method of claim 1, wherein the bearer context comprises packet filter information and quality of service information.

9. The method of claim 1, wherein the bearer context is obtained as a result of a resource request initiated by the access terminal.

10. The method of claim 1, wherein the network entity comprises a mobility management entity.

11. An apparatus for communication, comprising:
    a bearer context manager configured to obtain bearer context at an access terminal, and further configured to locally deactivate the bearer context at the access terminal when the access terminal is unable to communicate with a network entity, wherein the deactivation is triggered by the access terminal initiating resource release for all traffic flows associated with the bearer context and is performed without peer-to-peer signaling between the access terminal and the network entity; and
    a synchronizer configured to synchronize the bearer context with the network entity after the deactivation, wherein the synchronization comprises sending a tracking area update request to the network entity.

12. The apparatus of claim 11, wherein the tracking area update request is sent in response to a back to wireless coverage indication provided by a lower layer process.

13. The apparatus of claim 11, wherein the deactivation is triggered if each packet filter associated with the bearer context is designated as invalid.

14. The apparatus of claim 11, wherein the synchronization comprises sending a message that indicates that the bearer context has been deactivated.

15. An apparatus for communication, comprising: means for obtaining bearer context at an access terminal;
    means for locally deactivating the bearer context at the access terminal when the access terminal is unable to communicate with a network entity, wherein the deactivation is triggered by the access terminal initiating resource release for all traffic flows associated with the bearer context and is performed without peer-to-peer signaling between the access terminal and the network entity; and
    means for synchronizing the bearer context with a network entity after the deactivation, wherein the synchronization comprises sending a tracking area update request to the network entity.

16. The apparatus of claim 15, wherein the tracking area update request is sent in response to a back to wireless coverage indication provided by a lower layer process.

17. The apparatus of claim 15, wherein the deactivation is triggered if each packet filter associated with the bearer context is designated as invalid.

18. The apparatus of claim 15, wherein the synchronization comprises sending a message that indicates that the bearer context has been deactivated.

19. A computer-program product, comprising:
    a non-transitory computer-readable medium comprising code for causing a computer to: obtain bearer context at an access terminal;
    locally deactivate the bearer context at the access terminal when the access terminal is unable to communicate with a network entity, wherein the deactivation is triggered by the access terminal initiating resource release for all traffic flows associated with the bearer context and is performed without peer-to-peer signaling between the access terminal and the network entity; and
    synchronize the bearer context with the network entity after the deactivation, wherein the synchronization comprises sending a tracking area update request to the network entity.

20. The computer-program product of claim 19, wherein the tracking area update request is sent in response to a back to wireless coverage indication provided by a lower layer process.

21. The computer-program product of claim 19, wherein the deactivation is triggered if each packet filter associated with the bearer context is designated as invalid.

22. The computer-program product of claim 19, wherein the synchronization comprises sending a message that indicates that the bearer context has been deactivated.

23. A method of communication, comprising:
    maintaining bearer context for an access terminal at a network entity;

receiving, at the network entity, a resource release request for at least one but not all packet filters associated with the bearer context, wherein a resource release request for the at least one packet filter associated with the bearer context is not received by the network entity because the access terminal has become unable to communicate with the network entity;

receiving a message from the access terminal that comprises information about bearer contexts maintained at the access terminal;

comparing the information received in the message with bearer context information maintained for the access terminal at the network entity; and updating status of the maintained bearer context in response to the comparison, wherein the message comprises a tracking area update request.

24. The method of claim 23, wherein the message identifies any bearer context that is active at the access terminal.

25. The method of claim 24, further comprising determining that the maintained bearer context has been deactivated by the comparison.

26. The method of claim 23, wherein updating the status comprises deactivating the maintained bearer context.

27. The method of claim 23, wherein updating the status comprises releasing any resources associated with the maintained bearer context.

28. The method of claim 23, further comprising setting up the bearer context in response to a resource request from the access terminal.

29. The method of claim 28, wherein the receipt of the message is not a result of a resource release message being sent to the access terminal.

30. The method of claim 23, wherein the bearer context comprises packet filter information and quality of service information.

31. The method of claim 23, wherein the bearer context is maintained at a mobility management entity.

32. An apparatus for communication, comprising:
a bearer context manager configured to maintain bearer context for an access terminal at a network entity and to receive, at the network entity, a resource release request for at least one but not all packet filters associated with the bearer context, wherein a resource release request for the at least one packet filter associated with the bearer context is not received by the network entity because the access terminal has become unable to communicate with the network entity; and
a communication controller configured to receive a message from the access terminal that comprises information about bearer contexts maintained at the access terminal and to compare the information received in the message with bearer context information maintained for the access terminal at the network entity, wherein the bearer context manager is further configured to update status of the maintained bearer context in response to the comparison, wherein the message comprises a tracking area update request.

33. The apparatus of claim 32, wherein the message identifies any bearer context that is active at the access terminal.

34. The apparatus of claim 32, wherein updating the status comprises deactivating the maintained bearer context.

35. The apparatus of claim 32, wherein updating the status comprises releasing any resources associated with the maintained bearer context.

36. An apparatus for communication, comprising:
means for maintaining bearer context for an access terminal at a network entity;
means for receiving, at the network entity, a resource release request for at least one but not all packet filters associated with the bearer context, wherein a resource release request for the at least one packet filter associated with the bearer context is not received by the network entity because the access terminal has become unable to communicate with the network entity;
means for receiving a message from the access terminal that comprises information about bearer contexts maintained at the access terminal, wherein the message comprises a tracking area update request;
means for comparing the information received in the message with bearer context information maintained for the access terminal at the network entity; and
means for updating status of the maintained bearer context in response to the comparison.

37. The apparatus of claim 36, wherein the message identifies any bearer context that is active at the access terminal.

38. The apparatus of claim 36, wherein updating the status comprises deactivating the maintained bearer context.

39. The apparatus of claim 36, wherein updating the status comprises releasing any resources associated with the maintained bearer context.

40. A computer-program product, comprising:
a non-transitory computer-readable medium comprising code for causing a computer to:
maintain bearer context for an access terminal at a network entity;
receive, at the network entity, a resource release request for at least one but not all packet filters associated with the bearer context, wherein a resource release request for the at least one packet filter associated with the bearer context is not received by the network entity because the access terminal has become unable to communicate with the network entity;
receive a message from the access terminal that comprises information about bearer contexts maintained at the access terminal, wherein the message comprises a tracking area update request;
compare the information received in the message with bearer context information maintained for the access terminal at the network entity; and
update status of the maintained bearer context in response to the comparison.

41. The computer-program product of claim 40, wherein the message identifies any bearer context that is active at the access terminal.

42. The computer-program product of claim 40, wherein updating the status comprises deactivating the maintained bearer context.

43. The computer-program product of claim 40, wherein updating the status comprises releasing any resources associated with the maintained bearer context.

* * * * *